US006560883B2

(12) United States Patent
Jackson et al.

(10) Patent No.: US 6,560,883 B2
(45) Date of Patent: May 13, 2003

(54) METHOD AND SYSTEM FOR CONDUCTING WHEEL ALIGNMENT

(75) Inventors: David A. Jackson, Point Roberts, WA (US); James L. Dale, Jr., Conway, AR (US)

(73) Assignee: Snap-On Technologies, Inc., Lincolnshire, IL (US)

( * ) Notice: Subject to any disclaimer, the term of this patent is extended or adjusted under 35 U.S.C. 154(b) by 0 days.

(21) Appl. No.: 09/888,391

(22) Filed: Jun. 26, 2001

(65) Prior Publication Data

US 2002/0020071 A1 Feb. 21, 2002

Related U.S. Application Data

(60) Provisional application No. 60/214,390, filed on Jun. 28, 2000.

(51) Int. Cl.[7] ........................ G01B 5/255; G01B 11/275
(52) U.S. Cl. ........................ 33/203; 33/203.18; 33/288
(58) Field of Search .......................... 33/203, 286, 288, 33/203.18, 203.19, 203.2, 203.13, 203.14; 356/155, 139.09; 701/29, 36

(56) References Cited

U.S. PATENT DOCUMENTS

| 3,187,440 A | | 6/1965 | Merrill et al. ............ 33/203.13 |
|---|---|---|---|
| 3,643,337 A | | 2/1972 | Dick ........................ 33/203.13 |
| 4,110,913 A | | 9/1978 | Dick ............................. 33/336 |
| 4,249,824 A | * | 2/1981 | Wiederrich et al. ........... 356/155 |
| 5,014,227 A | * | 5/1991 | Kling et al. .................. 700/280 |
| 5,165,177 A | * | 11/1992 | Kercheck .................. 33/203.18 |
| 5,208,646 A | | 5/1993 | Rogers et al. ........... 356/139.09 |
| 5,519,488 A | | 5/1996 | Dale et al. .............. 356/139.09 |
| 5,553,389 A | * | 9/1996 | Winslow et al. .......... 33/203.18 |
| 5,675,515 A | | 10/1997 | January ....................... 700/279 |
| 5,724,743 A | | 3/1998 | Jackson ......................... 33/288 |
| 5,812,256 A | * | 9/1998 | Chapin et al. ........... 356/139.09 |
| 5,832,617 A | * | 11/1998 | Gill ............................... 33/203 |
| 5,875,418 A | * | 2/1999 | Gill et al. .................... 702/150 |
| 5,943,783 A | | 8/1999 | Jackson ......................... 33/288 |
| 5,978,077 A | | 11/1999 | Koerner et al. ......... 356/139.09 |
| 6,070,332 A | | 6/2000 | Kane ....................... 33/203.13 |

FOREIGN PATENT DOCUMENTS

| DE | 19730524 C1 | 12/1998 |
|---|---|---|
| EP | GB2258315 A | 2/1993 |
| EP | 0533143 | 3/1993 |
| WO | WO 99/03018 | 1/1999 |

OTHER PUBLICATIONS

Hunter Engineering Co., "Mercedes–Benz Wheel Alignment System" operations instruction manual, Hunter Engineering Co. Form No 4292T dated Nov. 1998, p. 31.*

* cited by examiner

*Primary Examiner*—Diego Gutierrez
*Assistant Examiner*—R. Alexander Smith
(74) *Attorney, Agent, or Firm*—McDermott, Will & Emery

(57) ABSTRACT

A method and system for providing an improved camber adjustment technique. The method comprises the steps of: turning the steerable wheel to a first position in which the steerable wheel is either toe-in or toe-out, then turning the steerable wheel to a second position in which the steerable wheel is toe-out if the steerable wheel is toe-in in the first position, and in which the steerable wheel is toe-in if the steerable wheel is toe-out in the first position. Toe angles and camber angles during the turning of the steerable wheel from the first position to the second position are measured. An adjustment amount of camber at any toe angle is determined by the difference between the camber angle at zero toe and a specification camber angle.

8 Claims, 4 Drawing Sheets

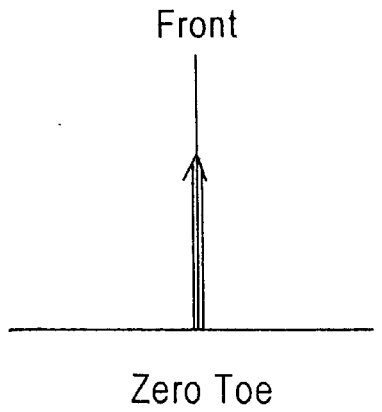
Zero Toe
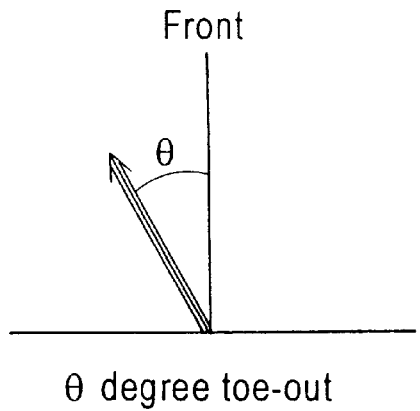
θ degree toe-out
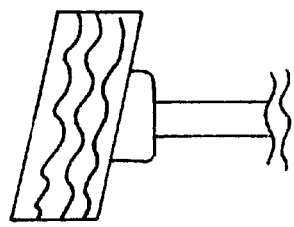
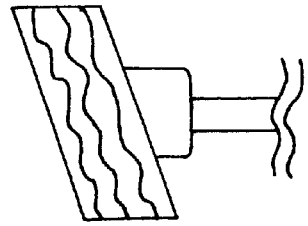
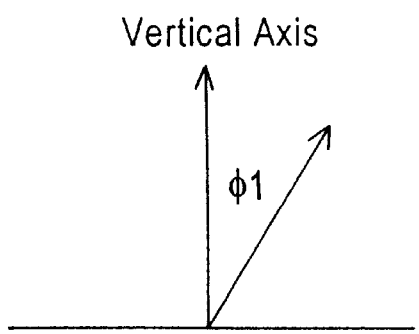
Camber = φ1 degree
FIG. 1A
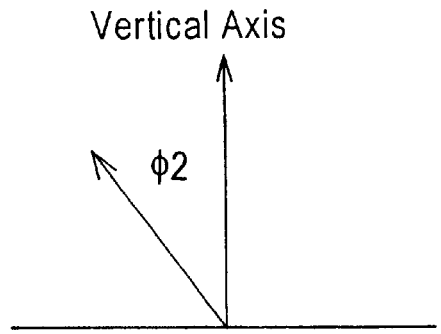
Camber = φ2 degree
FIG. 1B

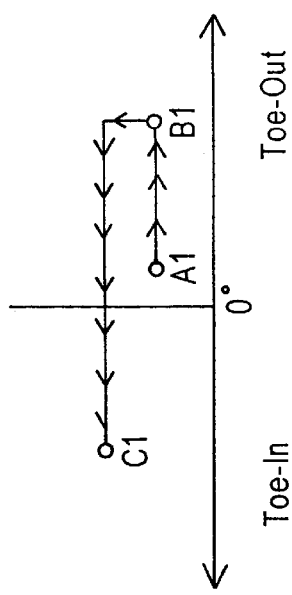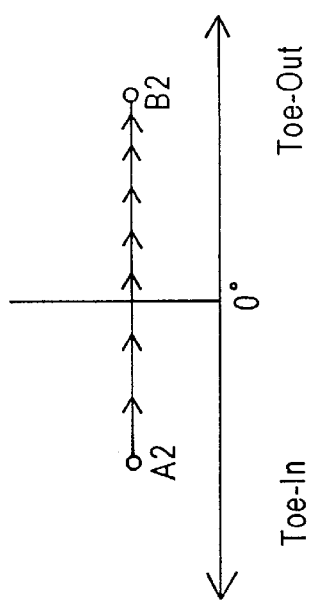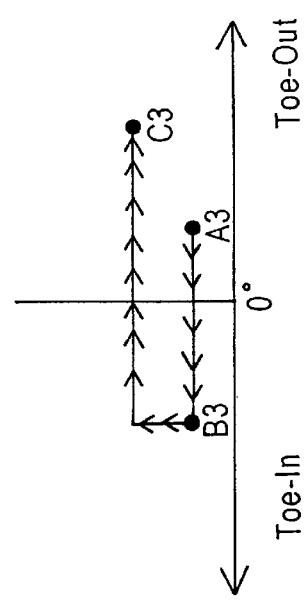

METHOD AND SYSTEM FOR CONDUCTING WHEEL ALIGNMENT

RELATED APPLICATION

The present application claims the benefit of priority from U.S. Provisional Patent Application Serial No. 60/214,390 filed Jun. 28, 2000, entitled "METHOD AND APPARATUS FOR PERFORMING UNDERCAR DIAGNOSTICS."

FIELD OF INVENTION

The present invention relates to a wheel alignment system, and more particularly, to a method and system providing an improved technique for adjusting camber during wheel alignment.

BACKGROUND OF THE INVENTION

Proper wheel alignment of an automotive vehicle is important for handling of the vehicle and for tire wear. In addition, proper wheel alignment increases fuel efficiency and safety.

The wheels of a motor vehicle may be aligned in a number of ways. For example, an operator or an alignment technician can use a vision imaging system such as a computer-aided, three-dimensional (3D) machine vision that employs optical sensing devices, such as cameras, to determine the positions of various objects. Examples of such apparatus and methods are disclosed in U.S. Pat. No. 5,724,743, entitled "Method and Apparatus for Determining the Alignment of Motor Vehicle Wheels," issued to Jackson, et al. on Mar. 10, 1998 and in U.S. Pat. No. 5,535,522, entitled "Method and Apparatus for Determining the Alignment of Motor Vehicle Wheels," issued to Jackson, et al. on Jul. 16, 1996, each incorporated herein by reference.

During an alignment process, a number of parameters are measured and adjusted to achieve proper wheel alignment. These parameters include camber, caster, steering axis inclination (SAI) and toe.

A camber angle is the inclination of the wheel plane from side view with respect to the vertical plane. A camber angle is defined positive when the wheel leans outward at the top, and negative when it leans inward.

A caster angle is the measurement between the tire's vertical centerline of the steering axis through the upper and lower ball joints. Caster angle is the angle between the tire's vertical centerline of the steering axis through the upper and lower ball joints. A caster angle is considered positive when the top of steering axis is inclined rearward and negative when the top of the steering axis is inclined forward. Positive caster settings provide a greater degree of steering efforts, self-centering and stability to the vehicle. Therefore, nearly every car has a positive caster setting. A large positive caster provides greater stability in high-speed, straight-ahead driving, but at low speeds, steering is heavy. A smaller positive caster setting makes for easier low-speed steering, but at high speeds, the vehicle will tend to wander.

Steering axis inclination (SAI) is the angle in the front elevation between the steering axis and vertical.

A toe angle of a wheel, at a specified wheel, is the angle between a longitudinal axis of the vehicle and the line of intersection of the wheel plane and the road surface. The wheel is toe-in if the forward portion of the wheel is turned toward a central longitudinal axis of the vehicle, and toe-out if turned away.

Camber, caster, and SAI are typically measured using inclinometers attached to the wheel. With camber, the inclinometer measures the angle that the plane of the wheel makes with the vertical. To measure caster, the wheel is turned through an arc, and the difference in the camber readings is used to derive the caster value. This procedure is called a caster swing.

SAI is measured in a manner similar to caster, except that the inclinometer used for the SAI reading measures the change in pitch angle of a line in the plane of the wheel as the wheel is turned through an arc. The SAI measuring inclinometer is aligned at 90° to the inclinometer used for reading camber and caster.

A camber angle indicates the amount of inclination of a steerable wheel. The value of camber is affected by several different factors and changes with the directions of steerable wheels. In other words, the degree of wheel inclination of a steerable wheel changes during the rotation of the steerable wheel. The factors affecting the value of camber include the steering angle, caster and SAI. The values of caster and SAI will cause a unique relationship to exist between steering angle (toe), camber and SAI. Changes of camber are proportional to the values of caster, the steering angle and the SAI. Since caster and SAI are fixed, then a relationship of camber relative to toes exits. This may be measured empirically, or may be calculated, based upon camber, caster and SAI settings.

FIGS. 1a and 1b illustrate camber angles of a steerable wheel at different toe angles. The steerable wheel depicted in FIGS. 1a and 1b is the left front wheel of an automotive vehicle. In FIG. 1a, the steerable wheel is at zero toe. The steerable wheel has a negative camber of $\phi 1$ degree. In FIG. 1b, the steerable wheel is at $\theta$ degree toe-out and has a positive camber of $\phi 2$ degree. As a result, if an adjustment of camber is to be made at $\theta$ degree toe-out to achieve a specification camber angle, for example, zero degree camber, a $\phi 2$ degree adjustment must be made to achieve zero degree camber. However, the $\phi 2$ degree adjustment in camber will result in a camber at $(\phi 1+\phi 2)$ degree at zero toe. Therefore, an adjustment of camber carried out at non-zero toe is usually inaccurate.

For purpose of wheel alignment, manufacturers specify an acceptable camber value at zero toe. However, some technicians may make camber adjustment when toe is not zero because by doing so, the technicians do not have to turn the wheel to zero toe every time before making an adjustment to the camber.

Adjusting camber at non-zero toe is sometimes acceptable for vehicles with small caster and SAI. If the caster and SAI are small, the difference of camber at different steerable angle is also very small. Thus, the amount of camber adjustment at different steering angles is similar and the differences can be ignored.

However, for vehicles with large caster and SAI, such as Mercedes-Benz, this approach will cause inaccurate adjustment of camber. For example, the camber at zero toe may be two degree, but the camber for the same vehicle might be 15 degrees at ten degrees toe. If a technician makes a 15 degrees camber adjustment at ten degrees toe, the camber will become minus 13 degrees at zero toe.

Accordingly, vehicle manufacturers, especially those vehicles with large caster, strictly require camber adjustment to be made at zero toe.

This requirement causes problems to technicians. For instance, if a technician wants to adjust the camber of the left front wheel, the technician would have to turn the steering wheel to turn the left front wheel to zero toe first and then adjust the camber and relate it to the manufacturer's specification. Then the technician would have to take the steering wheel again, turn the right front wheel to zero toe and then adjust camber for the right front wheel. Consequently, the problem is that the procedure is time consuming because the technician is constantly adjusting the steering wheel to position the steerable wheels to zero toe positions. In addition, this procedure could introduce errors because any small deviation of toe from zero during the adjustment will affect camber.

SUMMARY OF THE INVENTION

Accordingly, there exists a need for increasing alignment efficiency. There is also a need to simplify alignment procedures. There is also a need for accurately adjusting camber. Still another need exists for providing an alignment procedure that does not require precise positioning of steerable wheels at zero toe position.

These and other needs are addressed by the present invention. The present invention provides a method and system for providing an improved camber adjustment technique. This invention increases technicians' efficiency by simplifying alignment procedures and at the same time provides accurate camber adjustment.

One aspect of the present invention relates to a method for measuring the amount of camber adjustment for a steerable wheel. The method comprises the steps of: turning the steerable wheel to a first position in which the steerable wheel is either toe-in or toe-out; turning the steerable wheel to a second position in which the steerable wheel is toe-out if the steerable wheel is toe-in in the first position, and in which the steerable wheel is toe-in if the steerable wheel is toe-out in the first position; measuring toe angles and camber angles during the turning of the steerable wheel from the first position to the second position; determining the amount of camber angle of the steerable wheel at zero toe; and determining an adjustment amount of camber angle based on a specification camber angle and the amount of camber angle at zero toe.

The steerable wheels typically are the front wheels of an automotive vehicle. According to one aspect of the present invention, a steerable wheel is first turned to a first position, such as a toe-out position and then turned to a second position having an direction opposite to the first position, such as a toe-in position. Alternatively, the sequence can be carried out in reverse by turning the steerable wheel to a toe-in position first and then to a toe-out position. Thereby, during the turning of the steerable wheel from the first position to the second position, the steerable wheel will pass zero toe at least once.

During the turning of the steerable wheel from the first position to the second position, the camber angles and the toe angles of the steerable wheel are measured. According to one aspect of the invention, the camber angles corresponding to each toe angle are recorded. Alternatively, only the camber at zero toe is recorded. In another example, every toe angle is measured and recorded, while only the camber angle at zero toe is measured and recorded. In still another example of the invention, camber angles corresponding to each toe value are measured during a short period when the toe angle of the steerable wheel approaches and leaves zero toe.

Accordingly, in another aspect of the present invention, the toe sensor, camber sensor, and SAI measurement sensor are used to measure characteristics of the suspension, usually the steering axis, which is defined by the caster angle and the SAI angle. Then, using these known characteristics, the same relationships are used in a reversed manner to describe the relationship between steering angle (toe) and camber. Thus, for any steering angle, the camber effect from zero toe is calculated, allowing the camber to be set to the desired specification by altering the specification by the calculated effect in camber.

According to another aspect of the present invention, a wheel alignment system for measuring the amount of camber adjustment for a steerable wheel is provided. The wheel alignment system comprises: a toe measurement device configured for generating toe angle signals representative of toe angles of the steerable wheel; a camber measurement device configured for generating camber angle signals representative of camber angles of the steerable wheel; and a computer configured to carry out the steps of: receiving signals representative of toe angles and camber angles during the steerable wheel being turned to a first position in which the steerable wheel is either toe-in or toe-out, to a second position in which the steerable wheel is toe-out if the steerable wheel is toe-in in the first position, and in which the steerable wheel is toe-in if the steerable wheel is toe-out in the first position; determining the amount of camber angle at zero toe; and determining an adjustment amount of camber angle based on the amount of camber angle at zero toe and the current camber angle.

The toe measurement device and the camber measurement device are configured to measure camber angles and toe angles. As one embodiment, the toe measurement device and the camber measurement device may comprise a plurality of targets and optical sensing means for imaging. The targets are attached to the vehicle for marking each measurement point. The images of the targets are captured by the optical sensing means, such as a camera, and analyzed by a computer coupled to the optical sensing means. According to another embodiment, the toe measurement device and the camber measurement device comprise a signal source, such as an LED or an LED array or infrared emitting devices, and a sensor. The toe measurement device and the camber measurement device may comprise laser sources and optical sensing means, such as video cameras.

The computer is configured to execute alignment software and receive signals representative of toe angles and camber angles from the toe measurement device and the camber measurement device. The steerable wheel may be turned to a first position, wherein the toe angle of the steerable wheel is either toe-in or toe-out. The steerable wheel is then turned to a second position, wherein the steerable wheel is toe-out if the steerable wheel is toe-in in the first position, and the steerable wheel is toe-in if the steerable wheel is toe-out in the first position. The toe angles and camber angles during the turning of the steerable wheel are detected and recorded, and sent to the computer. The camber angle at zero toe is then determined by the computer according to the received signals. The computer calculates the adjustment amount of camber based on the difference of the camber angle at zero toe and a specification camber angle.

The alignment software may be stored in a hard drive memory associated with the computer, or on a CD-ROM disk readable by a CD-ROM drive associated with the computer. Alternatively, the alignment software may be stored in a remote computer accessible by the computer via a network.

According to another aspect of the invention, the current camber angle of the steerable wheel is measured. The adjustment amount of camber angle and the current camber angle are displayed based on a display coupled to the computer. For example, a camber angle equal to the current camber angle from which the adjustment amount of camber angle is subtracted is displayed to assist the technician in carrying out the alignment process.

Still other advantages of the present invention will become readily apparent from the following detailed description, simply by way of illustration of the invention and not limitation. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings in which like reference numerals refer to similar elements and in which:

FIGS. 1a and 1b illustrate camber angles of a steerable wheel at different toe angles.

FIG. 2 shows examples of turning of steerable wheels during implementation of the invention.

DESCRIPTION OF THE PREFERRED EMBODIMENT

Figure 3:
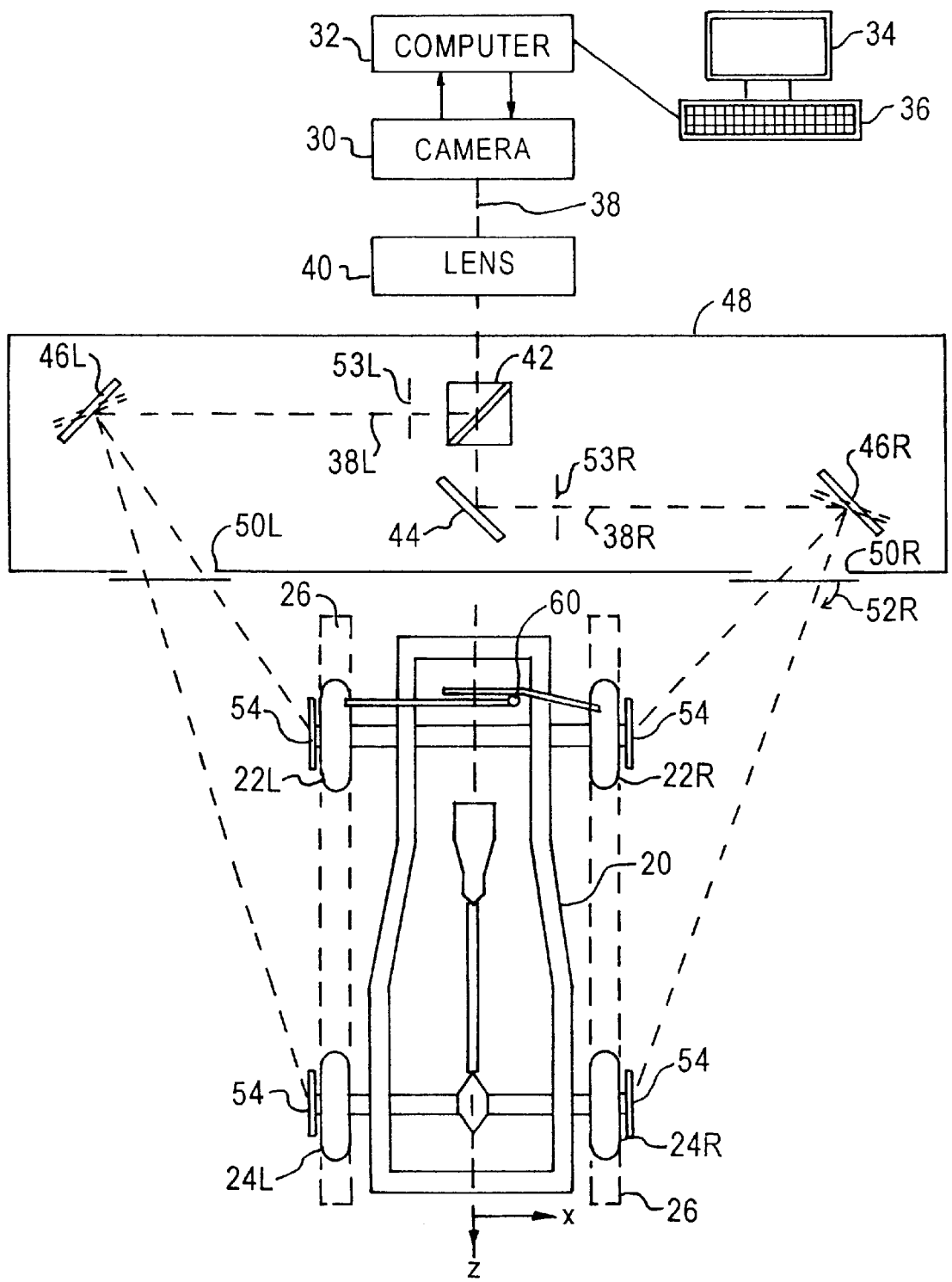
FIG. 3 illustrates an example of a wheel alignment system on which the present invention may be implemented.

Improved techniques for providing an alignment method and system are presented. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

According to a method of the present invention, alignment of wheel camber is carried out using a novel procedure. The steerable wheel is first turned from a toe-in position to a toe-out position. Conversely, the steerable wheel may be turned from a toe-out position to a toe-in position. The toe-out or toe-in angles through which the wheels are turned do not have to be precise or equal. Measurements of camber and toe angles are continuously taken during the turning of the steerable wheel.

FIG. 2 shows examples of turning of steerable wheels. In FIG. 2a, a steerable wheel is first positioned at a toe-out position (a1), then turned to another toe-out position (b1) and then to a toe-in position (c1). FIG. 2b shows an example where a steerable wheel is first positioned at a toe-in position (a2) and then turned to a toe-out position (b2). FIG. 2c shows a third example where a steerable wheel is first positioned at a toe-out position (a3), and turned to a toe-in position (b3) and then to a toe-out position (c3). In each case, the steerable wheel passes through zero toe position at least once. Since measurements of camber angles and toe angles are taken during the turning of the steerable wheel, the camber angle at zero toe is included in the measurements.

The correct amount of camber adjustment at any toe angle is calculated based on the camber angle at zero toe and a specification camber angle. The difference between the camber angle at zero toe and the specification camber angle is the correct amount of adjustment needed. Adjustment of camber can therefore be correctly made, despite that the steerable wheel is at a non-zero toe position. Accordingly, a technician does not have first to position the steerable wheel precisely at zero toe, then adjust camber at that position, next position the other wheel precisely at zero toe position and finally adjust camber of that steerable wheel at zero toe position.

One aspect of the present invention takes advantage of a caster swing procedure that is often carried out during measurement of caster and/or SAI of an automotive vehicle. A caster swing is the turning of a steerable wheel through an arc. Measurements of toe angles and camber angles are taken during the caster swing for calculating caster and/or SAI. Customarily, a caster swing is conducted both before and after adjustment of caster and/or SAI to ensure accurate adjustments. Measurements for camber and toe angles are taken during the caster swing. A curve relates toe to camber is then obtained. The curve reflects camber readings at different toe angles. If a caster swing procedure complies with the requirement as specified above, the curve will include a camber reading at zero toe, which can be used for calculating the amount of camber adjustment.

FIG. 3 illustrates an example of a wheel alignment system on which the present invention may be implemented. Other examples of alignment systems are disclosed in U.S. Pat. No. 5,724,743, entitled "Method and Apparatus for Determining the Alignment of Motor Vehicle Wheels," issued to Jackson, et al. on Mar. 10, 1998 and in U.S. Pat. No. 5,535,522, entitled "Method and Apparatus for Determining the Alignment of Motor Vehicle Wheels," issued to Jackson, et al. on Jul. 16, 1996, each incorporated herein by reference.

In FIG. 3, a motor vehicle 20 is represented by a schematic illustration of its chassis and is shown to include two front wheels 22L and 22R and two rear wheels 24L and 24R. The vehicle 20 is shown positioned on a conventional wheel alignment test bed 26, indicated in dotted lines.

The toe and camber measurement devices comprise a plurality of targets 54 and a video camera 30 that is coupled to a computer 32. The locations of targets 54 and the camera 30 are for illustration only. Other different locations of targets and cameras can be implemented for measuring alignment parameters.

The video camera 30 sights onto the targets 54 along a view path 38 which passes through a lens 40 and onto a beam splitter 42 and mirrors 46L and 46R. The computer 32 is configured to execute alignment software for processing signals sent from the camber and toe measurement devices.

Figure 4:
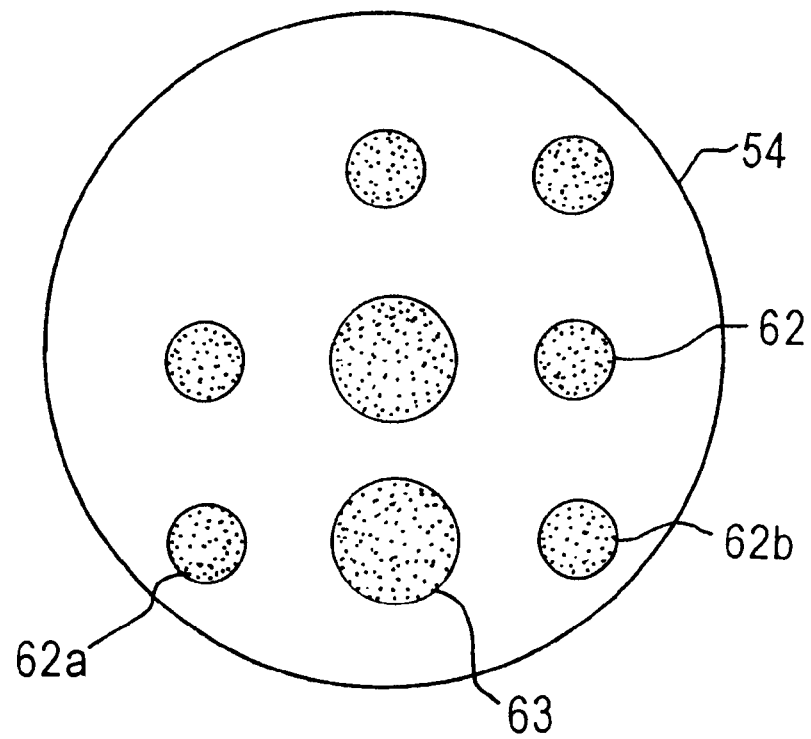
FIG. 4 shows an example of targets to be used with an alignment system on which the present invention my be implemented.

An example of a target that can be used in a wheel alignment system is illustrated in FIG. 4. Target 54 may consist of a flat plate with a pattern of two or more differently sized circles 62, 63 marked in a pre-determined format thereon. Although a specific pattern is shown, a large number of different patterns can be used on the target 54.

In practice, a mathematical representation, or data corresponding to a true image (i.e. an image taken by viewing the target device perpendicularly to its primary plane) and the dimensions of targets 54 are preprogrammed into the memory of the computer 32 so that, during the alignment process, the computer 32 has a reference image to which the viewed perspective images of the target devices can be compared.

The computer 32 calculates the orientation of the targets 54 by identifying certain geometric characteristics on the targets 54. The computer 32 takes perspective measurements and compares these measurements with the true image previously pre-programmed into the memory of the computer 32.

The computer 32 could, for example, calculate the center of each of the circles 62a, 62b by means of centroiding. This is a method commonly used by image analysis computers to determine the positioning of the center point or centerline of an object. Once the center points of the two circles 62a, 62b have been determined, the distance between the two can be measured. This process is then repeated for other circles in the pattern on the targets 54. These distances can then be compared to the true distances (i.e. non-perspective distances) between the respective centers. Similarly, the angle to the horizontal (or vertical) of the line joining the two centers can be determined. A calculation can then be made as to the orientations of the targets 54.

As described in above, a steerable wheel is first turned to a first position, where the wheel is at either toe-in or toe-out position, and then the wheel is turned to a second position in which the steerable wheel is toe-out if the steerable wheel is toe-in in the first position, and in which the steerable wheel is toe-in if the steerable wheel is toe-out in the first position. During the turning of the steerable wheel, toe angles and camber angles are measured. The amount of camber angle at zero toe is then determined according to the camber angles and toe angles.

An adjustment amount of camber angle is calculated based on the difference between the camber angle at zero toe and a specification camber angle. In one instance, an adjustment amount of camber angle is calculated by subtracting the camber angle at zero toe from a specification camber angle. A specification camber angle is, for example, the required camber angle at zero toe specified by the manufacturer. Information on the specification camber angle may be obtained from, for instance, the data storage device attached to the computer or from the Internet, or both. The adjustment amount of camber is then displayed to the technician for carrying out the alignment process. The amount of adjustment can be presented in numerical format, or the adjustment amount of camber angle may be displayed with a current camber angle of the steerable wheel in animation.

While this invention has been described in connection with an exemplary embodiment, it is to be understood that the invention is not limited to the disclosed embodiment, but on the contrary, is intended to cover various modifications and equivalent arrangements included within the spirit and scope of the appended claims.

What is claimed is:

1. A method for adjusting camber of a steerable wheel, comprising the steps of:
    turning the steerable wheel from a first position in which the steerable wheel is either toe-in or toe-out, to a second position in which the steerable wheel is toe-out if the steerable wheel is toe-in in the first position, and in which the steerable wheel is toe-in if the steerable wheel is toe-out in the first position;
    measuring toe angles and camber angles during the turning of the steerable wheel from the first position to the second position;
    determining the amount of camber angle of the steerable wheel at zero toe based on the camber angles obtained in the measuring step; and
    calculating an adjustment amount of camber angle based on the difference between a specification camber angle and the camber angle at zero toe.

2. The method of claim 1, wherein the adjustment amount of camber angle is displayed with the current camber angle of the steerable wheel.

3. A wheel alignment system for adjusting camber for a steerable wheel, comprising:
    a toe measurement device configured for generating toe angle signals representative of toe angles of the steerable wheel;
    a camber measurement device configured for generating camber angle signals representative of camber angles of the steerable wheel; and
    a computer configured to couple to the toe measurement device and the camber measurement device, wherein the computer is preprogrammed to carry out the steps of:
        receiving signals representative of camber angles and toe angles of the steerable wheel while the steerable wheel is turned from a first position in which the steerable wheel is either toe-in or toe-out, to a second position in which the steerable wheel is toe-out if the steerable wheel is toe-in in the first position, and in which the steerable wheel is toe-in if the steerable wheel is toe-out in the first position;
        determining the amount of camber angle of the steerable wheel at zero toe based on the camber angles obtained during the turning of the steerable wheel from the first position to the second position; and
        calculating an adjustment amount of camber angle based on the camber angle at zero toe and a specification camber angle.

4. The system of claim 3, wherein the toe measurement device comprises a first target and a first image sensor, and the camber measurement device comprises a second target and a second image sensor.

5. The system of claim 4, wherein the first target and the second target are light sources.

6. The system of claim 5, wherein the light sources are infrared emitting devices.

7. A wheel alignment system for adjusting camber for a steerable wheel, comprising:
    a toe measurement device configured for generating toe angle signals representative of toe angles of the steerable wheel;
    a camber measurement device configured generating camber angle signals representative of camber angles of the steerable wheel;
    a computer configured for connecting to the toe measurement device and the camber measurement device, wherein the computer is programmed to carry out the steps of:
        receiving signals representative of camber angles and toe angles during the turning of the steerable wheel from a first position in which the steerable wheel is either toe-in or toe-out, to a second position in which the steerable wheel is toe-out if the steerable wheel is toe-in in the first position, and in which the steerable wheel is toe-in if the steerable wheel is toe-out in the first position;
        determining the amount of camber angle of the steerable wheel at zero toe based on the camber angles obtained during the turning of the steerable wheel from the first position to the second position;
        determining an adjustment amount of camber angle based on the amount of camber angle at zero toe and a specification camber angle;
        displaying the adjustment amount of camber angle based on the current camber angle of the steerable wheel.

8. A computer-readable medium for use with a wheel alignment system for adjusting camber for a steerable wheel, in which the wheel alignment system comprises a toe measurement device configured for generating toe angle signals representative of toe angles of the steerable wheel, a camber measurement device configured for generating camber angle signals representative of camber angles of the steerable wheel, and a computer configured to couple to the toe measurement device and the camber measurement device, the computer-readable medium bearing instructions arranged to cause the computer to perform the steps of:

receiving signals representative of camber angles and toe angles of the steerable wheel during the steerable wheel being turned from a first position in which the steerable wheel is either toe-in or toe-out, to a second position in which the steerable wheel is toe-out if the steerable wheel is toe-in in the first position, and in which the steerable wheel is toe-in if the steerable wheel is toe-out in the first position;

determining the amount of camber angle of the steerable wheel at zero toe based on the camber angles obtained during the turning of the wheel from the first position to the second position; and calculating an adjustment amount of camber angle based on the camber angle at zero toe and a specification camber angle.

* * * * *